US006976775B2

(12) United States Patent
Koike

(10) Patent No.: US 6,976,775 B2
(45) Date of Patent: Dec. 20, 2005

(54) VEHICLE LAMP

(75) Inventor: Teruo Koike, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 71 days.

(21) Appl. No.: 10/662,325

(22) Filed: Sep. 16, 2003

(65) Prior Publication Data

US 2004/0213014 A1 Oct. 28, 2004

(30) Foreign Application Priority Data

Apr. 25, 2003 (JP) ............................ 2003-122090

(51) Int. Cl.[7] ................................................ B60Q 1/02
(52) U.S. Cl. ....................... 362/545; 362/240; 362/539
(58) Field of Search ............................... 362/237, 240, 362/241, 243, 247, 538, 539, 543, 544, 545, 362/800

(56) References Cited

U.S. PATENT DOCUMENTS

| | | | | |
|---|---|---|---|---|
| 6,565,247 | B2 * | 5/2003 | Thominet | 362/545 |
| 2001/0019486 | A1 | 9/2001 | Vincent | |
| 2003/0103348 | A1 * | 6/2003 | Hung | 362/247 |
| 2003/0227774 | A1 * | 12/2003 | Martin et al. | 362/240 |
| 2004/0223338 | A1 * | 11/2004 | Koike et al. | 362/545 |

FOREIGN PATENT DOCUMENTS

| | | | |
|---|---|---|---|
| EP | 1 298 383 A2 | | 4/2003 |
| EP | 1 371 901 A2 | | 12/2003 |
| JP | 2002-100217 | | 4/2002 |
| JP | 2003-31011 | | 1/2003 |
| WO | WO02/52190 | * | 4/2002 |

* cited by examiner

*Primary Examiner*—Y. My Quach-Lee
(74) *Attorney, Agent, or Firm*—Dickstein, Shapiro, Morin & Oshinsky, LLP.

(57) ABSTRACT

In vehicle lamps from the prior art using LED lamps as a light source, the insufficiency of quantity of light obtainable from the light source has made it difficult for headlamps and other illuminating lamps to be realized. A vehicle lamp 1 according to the present invention comprises a plurality of light sources 2 realized using LED arrays 22 disposing at least one or more LED chips 22*a* in a single row and reflecting surfaces 3 combined in a one-to-one correspondence with the respective light sources 2 and forming a prescribed light distribution pattern in each combination, characterized in that 2 to 12 sets in combinations of a single one of the light source and a single one of the reflecting surface are used, and an overall light distribution pattern is formed by combining the light distribution patterns formed by each set; and by realizing light sources using LED chips, a remarkable number of LEDs can be positioned in the vehicle lamp, thus resolving the problem of insufficient quantity of light, and in addition, enabling the formation of light distribution patterns with no associated problems.

5 Claims, 3 Drawing Sheets

VEHICLE LAMP

BACKGROUND OF THE INVENTION

1. Field of the Invention

The present invention relates to vehicle lamps such as front lights, auxiliary front lights or reversing lights that are mainly used for the purpose of illumination, and in particular, it concerns the design of vehicle lamps for illumination purposes that use a plurality of LED lamps (or one or more LED lamps upon which a plurality of LED chips have been mounted) as a light source in accordance with the fact that the quantity of light of a single LED lamp is insufficient.

2. Detailed Description of the Prior Art

Vehicle lamps using LED lamps as the source of light known in the prior art arrange a plurality of LED lamps in such a way that the individual optical axes thereof are directed towards the apex of a cone; mount a cylindrical light guide on each LED lamp so that the light from all LED lamps is made convergent at the apex; provide a hyperboloid-of-revolution reflecting surface in the vicinity of the apex so that the light from the plurality of LED lamps is converted into light appearing to be emitted from a single point and light distribution patterns can be formed with a main reflecting surface featuring a paraboloid-of-revolution shape or the like; and thus compensate for the insufficiency of quantity of light from a single LED lamp. (For example, see Reference Document 1)

Reference Document 1

The Japanese Patent Laid-Open No. 2002-100217 (Paragraph 9 through Paragraph 20, FIG. 1)

SUMMARY OF THE INVENTION

In the above-mentioned designs known in the prior art, however, a case or the like is mounted on each LED chip, and LED chips upon which light guides have been mounted are arranged in a ring-like pattern; consequently, the number of LED lamps that may be integrated is limited and insufficiencies still exist with regard to quantity of light. For this reason, difficulty is experienced in the practical implementation of these designs in headlamps and other vehicle lamps from which large volumes of light are required.

Furthermore, a high degree of precision is required during assembly with regard to the relative positions of light guides and hyperboloid-of-revolution reflecting surfaces, and also with regard to the relative positions of hyperboloid-of-revolution reflecting surfaces and main reflecting surfaces. Accordingly, assembly processes become more complicated and cumbersome, and this is manifested in the increased cost of vehicle lamps.

Furthermore, when the number of LED lamps is increased and a single reflecting surface is assembled with respect to a plurality of light sources, difficulty of light becoming spots or the like is experienced in terms of the formation of light distribution characteristics, and in addition, degradation of illumination quality as a result of factors such as the leakage of light from guide surfaces leads to reduced visibility and the like. These issues have yet to be resolved.

As a practical means of resolving the above-mentioned problems in the prior art, the vehicle lamp according to the present invention comprises a plurality of light sources realized using LED arrays disposing at least one or more LED chips in a single row and reflecting surfaces combined in a one-to-one correspondence with the respective light sources and forming a prescribed light distribution pattern in each combination, and is characterized in that 2 to 12 sets combinations of a single one of the light source and a single one of the reflecting surface are used, and an overall light distribution pattern is formed by combining the light distribution patterns formed by each set.

BRIEF DESCRIPTION OF THE DRAWINGS

These and others and advantages of the present invention will become clear from following description with reference to the accompanying drawing, wherein.

EXPLANATION OF REFERENCES

Figure 1:
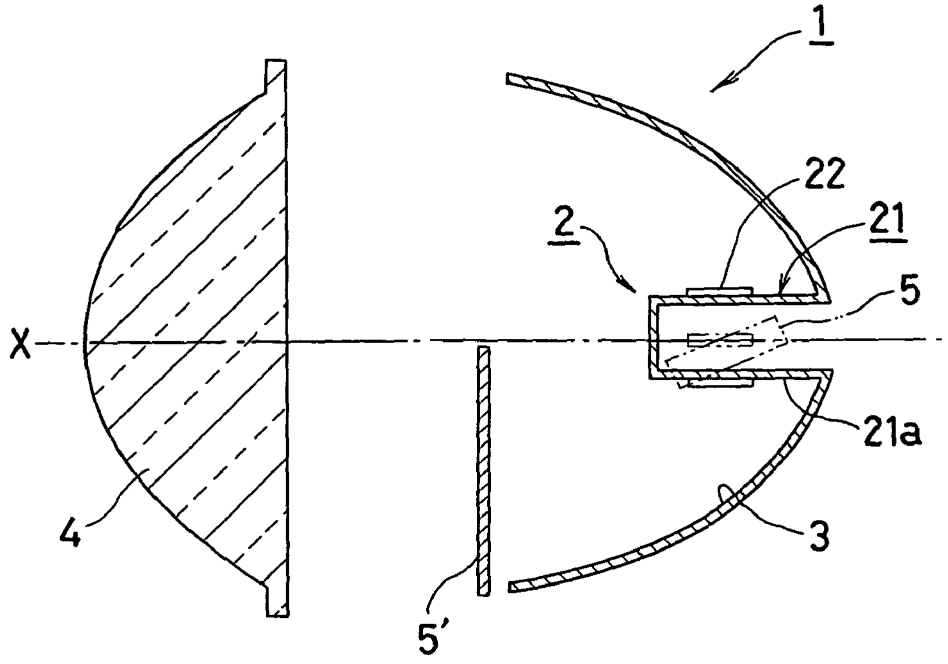
FIG. 1 is a cross-sectional block diagram showing an embodiment of a vehicle lamp according to present invention.

1: Vehicle lamp
2: Light source
21: Light source holder
21*a*: Side surface
22 (U, D, L, R, UL, DL): LED array
22*a*: LED chip
23: Cylindrical lens
3 (U, D, L, R): Reflecting surface
4: Projection lens
5: Shade

DETAILED DESCRIPTION OF THE PREFERRED EMBODIMENT

While the presently preferred embodiment of the present invention has been shown and described, it will be understood that the present invention is not limited thereto, and that various changes and modification may be made by those skilled in the art without departing from the scope of the invention as set forth in the appended claims.

Hereinafter, the present invention will be described by way of preferred embodiments thereof with reference to the accompanying drawings. Reference 1from FIG. 1 indicates a vehicle lamp according to the present invention. This vehicle lamp 1 comprises a light source 2, a reflecting surface 3, a projection lens 4, and if required, a shade 5 (or 5'), and furthermore, it fundamentally emulates the design known as a projector.

Figure 2:
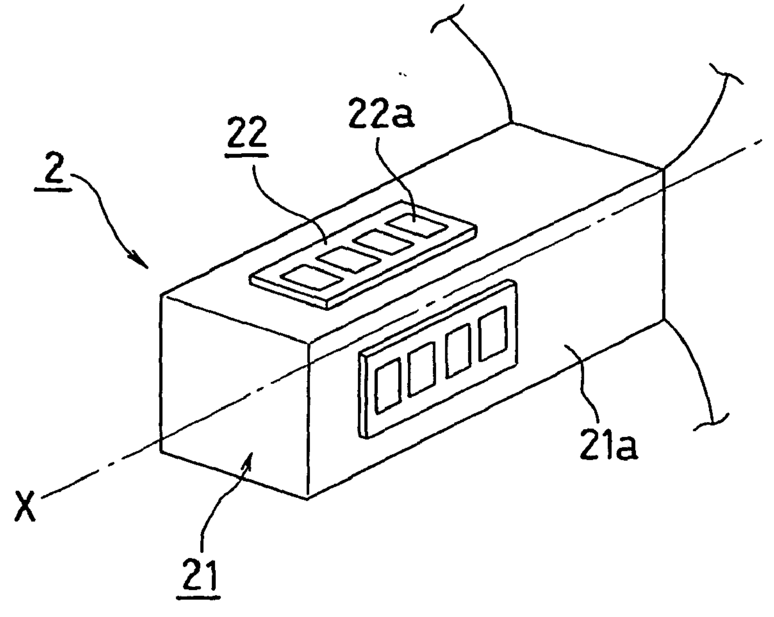
FIG. 2 is a perspective view showing a light source holder constituting a substantial part of the embodiment from FIG. 1.
Figure 3:
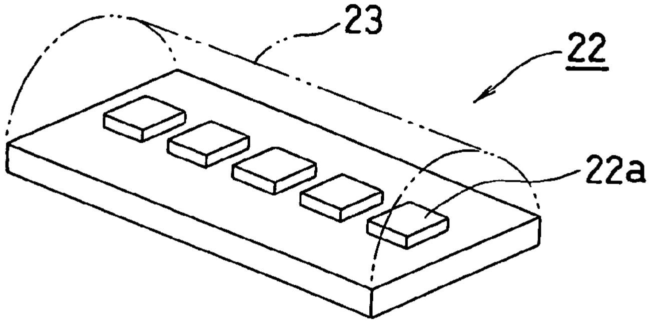
FIG. 3 is an explanatory drawing showing an LED array constituting a substantial part of the embodiment from FIG. 1.

FIG. 2 and FIG. 3 show the configuration of the light source 2, and in this embodiment, it comprises a light source holder 21 formed into an substantially square column shape, LED arrays 22 provided on the four side surfaces 21*a* of the light source holder 21, and a cylindrical lens 23 provided if required. Note that the present invention does not limit the number of side surfaces of the light source holder 21, and for example, a triangular column, a pentangular column, a hexagonal column, or any column with a greater number of sides can be freely used.

Although formed into a substantially square column shape as described above, the light source holder 21 is set up in such a way that the axial direction thereof is substantially coincident with the optical x-axis of the vehicle lamp 1. Similarly, in this embodiment, the axial directions of the side surfaces 21*a* of the light source holder 21 are parallel with the optical x-axis. In addition, in this embodiment, the cross section of the light source holder 21 is square in shape, and in mounted condition on a vehicle, two of the surfaces 21*a* are oriented horizontally top and bottom, and two are oriented vertically left and right.

As shown in the schematic view of substantial parts in FIG. 3, the LED array 22 is realized by mounting a plurality of LED chips 22*a* disposed in a straight-line pattern on the side surfaces 21*a* of the light source holder 21, and the direction of disposition of the LED chips 22*a* coincides with the axial direction of the side surfaces 21*a*, or in other words, with the optical x axis of the vehicle lamp 1.

Furthermore, the LED array 22 is provided with a cylindrical lens 23 oriented with the axis thereof being parallel to the optical x axis in order to provide for situations where, when the light distribution pattern of the vehicle lamp 1 is subsequently formed into a prescribed pattern using the reflecting surface 3, the projection lens 4, the shade 5, and the like, light illumination at a wider angle is preferred, or conversely, light illumination at a narrower angle is preferred.

When compared with the arrangement of a plurality of LED lamps as known in the prior art, the incorporation of a plurality of LED chips 22*a* into an LED array 22 in this way enables a larger number of LED chips 22*a* to be disposed in the same surface area and enables the quantity of light to be increased. In addition, as the present invention allows the LED array 22 to be positioned over the full length of the side surface 21*a* of the light source holder 21, further increases of quantity of light are made possible.

In the present invention, there is a one-to-one correspondence between each reflecting surface 3 and an LED array 22 (or a side surface 21*a*) from the light source 2 configured as described above. In other words, if a light source holder 21 according to this embodiment is configured with four side surfaces 21*a* (or four LED arrays 22), a total of four petal-shaped reflecting surfaces 3 corresponding to the individual side surfaces 21*a* are provided (FIG. 4).

Figure 4:
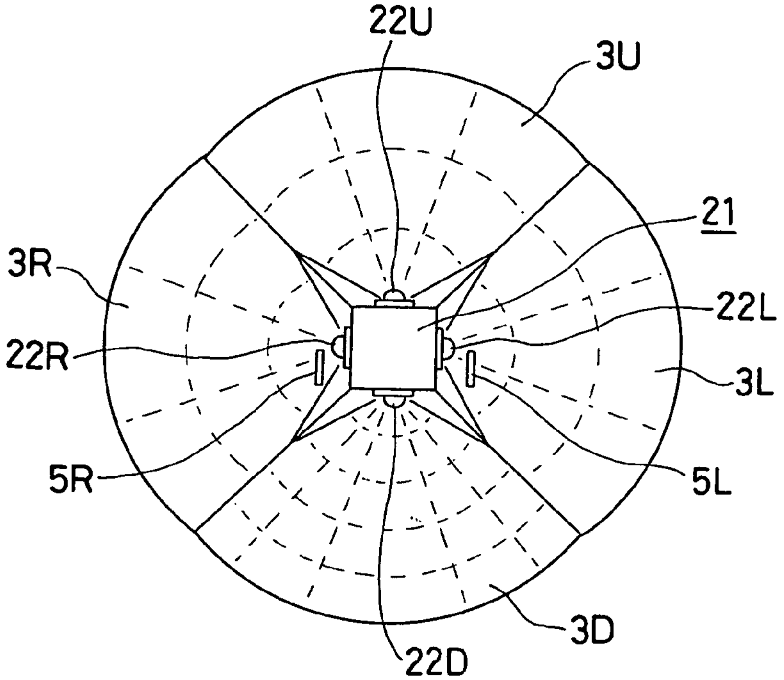
FIG. 4 is an explanatory drawing showing the correspondence between the LED arrays and the reflecting surfaces of the embodiment from FIG. 1.
Figure 5:
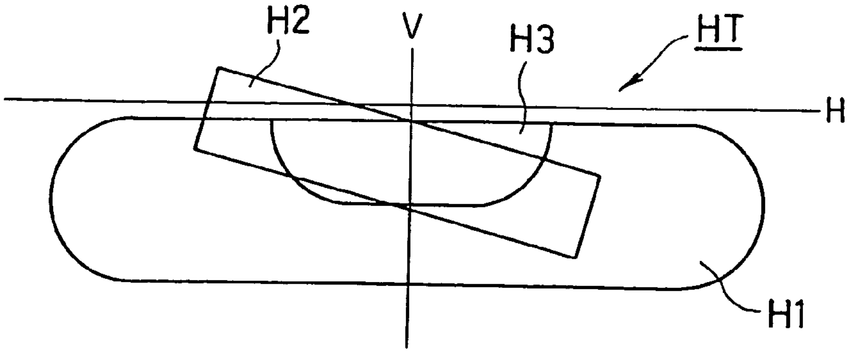
FIG. 5 is an explanatory drawing showing conditions upon the formation of light distribution patterns in the embodiment from FIG. 1.

FIG. 4 and FIG. 5 show conditions upon the formation of light distribution patterns HT in the vehicle lamp 1 according to the present invention and configured as described above. First of all, a light distribution pattern H1 (FIG. 5) is made incident below the horizon and illuminated widely in the left and right directions using the LED array 22U and the LED array 22D disposed on the top and bottom of the light source holder 21 and the corresponding reflecting surfaces 3U, 3D.

Furthermore, when viewing the vehicle lamp 1 from the driver's seat, a light distribution pattern H2 (FIG. 5) inclined upward to the left in order to illuminate the road side is formed using an LED array 22L disposed horizontally to the left, the corresponding reflecting surface 3L, and a shade 5L provided in the vicinity of the LED array 22L.

In addition, a light distribution pattern H3 (FIG. 5) made incident below the horizon and illuminating a relatively narrow area at the front of the vehicle is formed using an LED array 22R disposed horizontally to the right, the corresponding reflecting surface 3R, and a shade 5R, and by combining the light distribution patterns H1, H2, H3, the configuration according to the present invention prevents drivers of oncoming vehicles from being dazzled, and in addition, enables a dipped-beam light distribution pattern with excellent visibility to be obtained as the overall light distribution pattern.

If the relationship between the LED arrays 22 and the reflecting surfaces 3 upon the formation of the light distribution patterns described above is further examined, it can be seen that, as previously described, the LED arrays 22 face the reflecting surfaces 3 in a longitudinal direction parallel to the optical x axis, and therefore, when light distribution patterns are set, the same design methods as used with, for example, the filaments from a C-8 or other similar halogen bulbs can be implemented and setting can be carried out in a relatively simple fashion.

Figure 6:
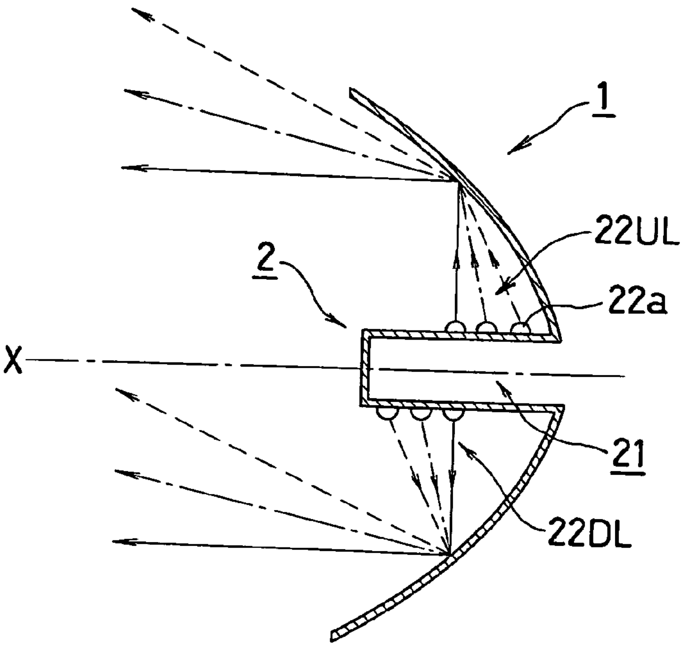
FIG. 6 is an explanatory drawing of the substantial parts of another embodiment of a vehicle lamp according to the present invention.

FIG. 6 is a schematic view of the substantial parts of another embodiment of a vehicle lamp 1 according to the present invention and it shows an LED array 22UL and an LED array 22DL disposed above and below the light source holder 21. In the previous embodiment, the LED array 22U is disposed in an area resulting in light being made incident below the horizon following reflection by the reflecting surface 3U, and the LED array 22D is also disposed in an area resulting in light being made incident below the horizon following reflection by the reflecting surface 3D.

In contrast, the LED array 22UL according to this embodiment features additional LED chips 22*a* disposed up to a position that results in light being made incident slightly above the horizon, and using a beam selection switch or a similar suitable means, the on or off condition can be selected for the LED chips 22 from the area of addition or beyond. Furthermore, in this embodiment, LED chips 22*a* are also similarly added to the LED array 22DL and the on or off condition thereof can be selected.

Figure 7:
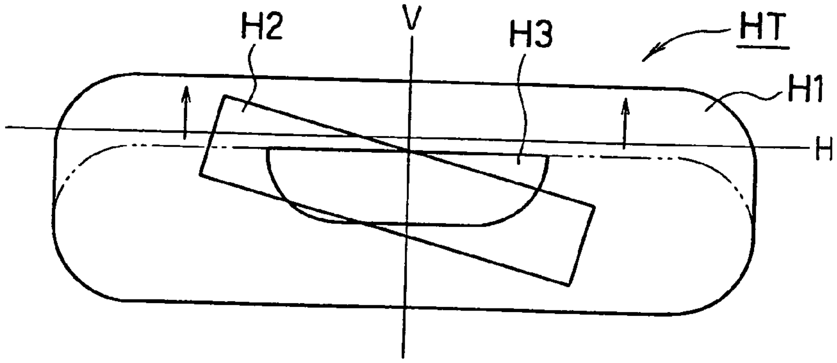
FIG. 7 is an explanatory drawing showing conditions upon the formation of light distribution patterns in another embodiment.

Thus, if for example a beam selection switch in the vicinity of the driver's seat is operated and the LED chips 22*a* from the added section are turned on, light emitted horizontally in the forward direction can be added to the dipped-beam light distribution pattern as described in the previous embodiment, and a driving light distribution pattern as shown in FIG. 7 can be obtained.

It is said that when the road surface immediately in front of the vehicle is brightly illuminated, driver visibility drops and distant locations become relatively difficult to see; accordingly, when the present invention is put to practical use in the formation of driving light distribution patterns, the LED chips 22*a* from LED array 22UL and LED array 22DL illuminating the area directly in front of the vehicle can be turned off or controlled in another similar way in response to operation of the beam selection switch as described above, thus further improving the effectiveness of the present invention.

Furthermore, although the above explanation assumes that FIG. 6 is a vertical cross section of the vehicle lamp 1, if this was assumed to be a horizontal cross section, it can be seen that the lighting of LED array 22 from the added section will result in the light being moved left and right. Accordingly, LED array 22 from the added section can be turned on and off in response to, for example, operation of the steering wheel to realize so-called cornering lamps.

Figure 8:
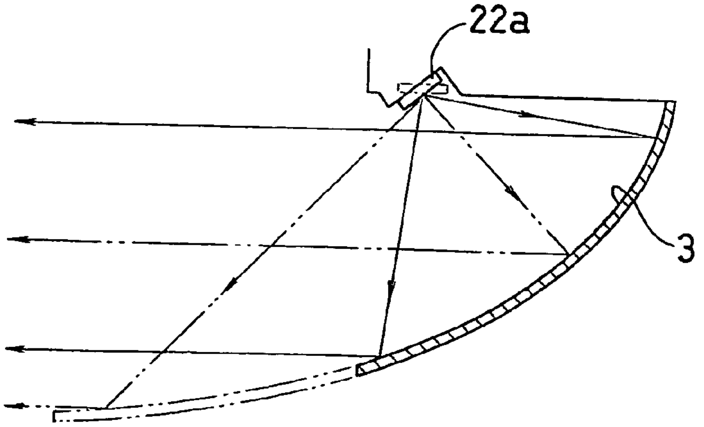
FIG. 8 is an explanatory drawing of a further embodiment of a vehicle lamp according to the present invention.

FIG. 8 is a schematic view of a further embodiment of a vehicle lamp 1 according to the present invention, and as in both of the previous embodiments, the LED array 22 is mounted on a side surface 21*a* oriented parallel to the optical x-axis. However, since the LED chip 22*a* emits light at an emission angle of 45° or greater, it is necessary for the reflecting surface 3 to be extended also in the forward direction in order to acquire this light, and as radial and depth dimensions increase accordingly, the vehicle lamp 1 becomes larger.

In this embodiment, therefore, when the LED array 22 is configured with a plurality of LED chips 22*a*, each LED chip 22*a* is inclined facing backwards; consequently, the depth dimension of the reflecting surface 3 can be reduced, this leads to smaller radial dimensions. Accordingly, the overall size of the vehicle light 1 can be decreased without reducing the volume of illuminated light.

The results of studies carried out by the inventors in the realization of the present invention concluded that the number of combinations of an LED array and a reflecting surface need not be restricted to four as used in the above explanation; rather, when a large quantity of light is required, the shape of the light source holder 21 can be changed to hexagonal or octagonal to increase the number of sides and thus the number of LED chips, or alternatively, when the light distribution is not required to be formed with a complicated pattern, LED arrays can be mounted on only two of the plurality of side surfaces 21*a* of the light source holder 21, and the number of reflecting surfaces 3 can be modified to two accordingly.

As described above, the vehicle lamp according to present invention comprises a plurality of light sources realized using LED arrays disposing at least one or more LED chips in a single row and reflecting surfaces combined in a one-to-one correspondence with the respective light sources and forming a prescribed light distribution pattern in each combination, characterized in that 2 to 12 sets in combinations of a single one of the light sources and a single one of the reflecting surfaces are used and an overall light distribution pattern is formed by combining the light distribution patterns formed by each set, the plurality of LED arrays constituting the light source are formed into a prescribed shape in the direction of light illumination of the vehicle lamp on the respective side surfaces of a light source holder formed into a substantially polygonal column shape and having an axis parallel to the illumination direction, and the reflecting surfaces encircle the light source holder; consequently, by forming LED arrays using a plurality of LED chips in the realization of a light source, the present invention primarily enables an extraordinary number of LED chips to be accumulated in smaller surface area than known in the prior art, thus solving the difficulty of insufficient quantity of light from LED light sources, and in this, achieving the remarkable result of enabling the realization of LED-type headlamps and other similar illuminating lamps.

What is claimed is:

1. A vehicle lamp, comprising a plurality of light sources using LED arrays disposing at least one or more LED chips in a single row and reflecting surfaces combined in a one-to-one correspondence with said respective LED arrays and forming a prescribed light distribution pattern in each combination, wherein 2 to 12 sets in combinations of a single one of said LED arrays and a single one of said reflecting surfaces are used, and an overall light distribution pattern is formed by combining the light distribution patterns formed by each set, the plurality of LED arrays constituting said light sources are formed into a prescribed shape in the direction of light illumination of said vehicle lamp and on the respective side surfaces of a light source holder formed into a substantially polygonal column shape having an axis parallel to said illumination direction, and said reflecting surfaces encircle said light source holder, and first and second shades obstructing the light from said LED array and forming said light distribution pattern is provided in the vicinity of said LED array and on the optical path of light from said light source to said reflecting surface, the first shade provided on a left side of said light source holder, the second shade provided on a right side of said light source holder, said first and second shades comprising substantially vertical side surfaces.

2. The vehicle lamp of claim 1, wherein a cylindrical lens having an axis parallel to the row direction of said LED arrays is provided on a portion of the plurality of light sources on said light source holder.

3. The vehicle lamp of claim 1 or 2, wherein a greater number of LED arrays than that of one which is required for formation of the basic light distribution pattern is formed up, and a light distribution pattern differing from the basic light distribution pattern can be obtained by controlling the number of lighting quantity and lighting positions thereof.

4. The vehicle lamp of claim 1 or 2, wherein said LED arrays constituting said light source or said LED chips having said LED array are inclined towards said reflecting surface.

5. The vehicle lamp of claim 3, wherein:

said LED arrays constituting said light source of said LED chips having said LED array are inclined towards said reflecting surface.

* * * * *